United States Patent [19]
Van Berkum

[11] Patent Number: 5,619,557
[45] Date of Patent: Apr. 8, 1997

[54] TELEPHONE SWITCHING SYSTEM AND METHOD FOR CONTROLLING INCOMING TELEPHONE CALLS TO REMOTE AGENTS AND FOR COLLECTING AND PROVIDING CALL DATA

[75] Inventor: Paul E. Van Berkum, Winfield, Ill.

[73] Assignee: Rockwell International Corporation, Downers Grove, Ill.

[21] Appl. No.: 500,301

[22] Filed: Jul. 10, 1995

[51] Int. Cl.⁶ .................................................. H04M 3/42
[52] U.S. Cl. ........................ 379/88; 379/112; 379/127; 379/142; 379/201; 379/265; 379/309
[58] Field of Search ................................. 379/265, 266, 379/309, 207, 210, 211, 201, 67, 88, 89, 112, 220, 127, 142

[56] References Cited

U.S. PATENT DOCUMENTS

| | | | |
|---|---|---|---|
| 4,048,452 | 9/1977 | Oehring et al. | 379/113 |
| 4,694,483 | 9/1987 | Cheung | 379/34 |
| 4,737,983 | 4/1988 | Frauenthal et al. | 379/221 |
| 4,866,758 | 9/1989 | Heinzelmann | 379/94 |
| 4,893,301 | 1/1990 | Andrews et al. | 370/58.2 |
| 5,008,930 | 4/1991 | Gawrys et al. | 379/210 |
| 5,062,103 | 10/1991 | Davidson et al. | 370/58.1 |
| 5,073,890 | 12/1991 | Danielsen | 370/58.2 |
| 5,097,528 | 3/1992 | Gursahaney et al. | 379/67 |
| 5,153,909 | 10/1992 | Beckle et al. | 379/265 |
| 5,168,515 | 12/1992 | Gechter et al. | 379/265 |
| 5,249,223 | 9/1993 | Vanacore | 379/309 |
| 5,271,058 | 12/1993 | Andrews et al. | 379/210 |
| 5,291,550 | 3/1994 | Levy et al. | 379/242 |
| 5,291,551 | 3/1994 | Conn et al. | 379/210 |
| 5,299,260 | 3/1994 | Shaio | 379/265 |
| 5,309,505 | 5/1994 | Szlam et al. | 379/265 |
| 5,309,513 | 5/1994 | Rose | 379/309 |
| 5,311,577 | 5/1994 | Madrid et al. | 379/93 |
| 5,317,630 | 5/1994 | Feinberg et al. | 379/94 |
| 5,329,583 | 7/1994 | Jurgensen et al. | 379/266 |
| 5,335,268 | 8/1994 | Kelly, Jr. et al. | 379/112 |
| 5,384,766 | 1/1995 | Yamato et al. | 370/13 |
| 5,384,841 | 1/1995 | Adams et al. | 379/266 |
| 5,392,345 | 2/1995 | Otto | 379/265 |
| 5,432,846 | 7/1995 | Norio | 379/266 |
| 5,448,632 | 9/1995 | Iyob et al. | 379/201 |
| 5,452,348 | 9/1995 | Adams et al. | 379/266 |
| 5,459,780 | 10/1995 | Sand | 379/309 |
| 5,469,503 | 11/1995 | Butensky et al. | 379/265 |
| 5,469,504 | 11/1995 | Blaha | 379/265 |
| 5,479,487 | 12/1995 | Hammond | 379/265 |
| 5,509,064 | 4/1996 | Welner et al. | 379/309 |
| 5,511,117 | 4/1996 | Zazzera | 379/309 |
| 5,519,772 | 5/1996 | Akman et al. | 379/201 |
| 5,533,102 | 7/1996 | Robinson et al. | 379/67 |
| 5,533,115 | 7/1996 | Hollenbach et al. | 379/201 |

OTHER PUBLICATIONS

Newton's Telecom Dictionary, Harry Newton, Nov. 1994, pp. 587, 1022–1025, 1069 & 1136.

*Primary Examiner*—Thomas W. Brown
*Assistant Examiner*—Scott Wolinsky
*Attorney, Agent, or Firm*—Welsh & Katz, Ltd.

[57] ABSTRACT

A telephone switching system (100) including an automatic call distributor (102) for routing incoming telephone calls over a telephone network (116) to agent telephonic units (112, 114) is provided. Data relating to each of the incoming telephone calls is collected by the automatic call distributor (102), in particular a central processing unit (110). As each incoming telephone call is being routed to an agent telephonic unit (112, 114) over a telephone network (116), its associated data is substantially simultaneously transmitted over a computer network (126) to an agent computer terminal (122, 124). The agent located at the agent telephonic unit (112 or 114) which receives an incoming telephone call has first party call control via the associated agent computer terminal (122 or 124).

16 Claims, 1 Drawing Sheet

TELEPHONE SWITCHING SYSTEM AND METHOD FOR CONTROLLING INCOMING TELEPHONE CALLS TO REMOTE AGENTS AND FOR COLLECTING AND PROVIDING CALL DATA

BACKGROUND OF THE INVENTION

The present invention relates generally to a telephone switching system which employs an automatic call distributor (ACD) and, more particularly, to a telephone switching system and method wherein data is transmitted between an ACD and agent computer terminals over a computer network and wherein incoming telephone calls routed by the telephone switching system to the agent computer terminals are subsequently controlled by control signals generated by the agent computer terminals and transmitted to the ACD over the computer network to provide first party call control.

Telephone switching systems employing automatic call distributors (ACD) are increasingly used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System", the disclosure of which is hereby incorporated by reference.

In order to further increase the flexibility of telephone switching systems, manufacturers have attempted, with some success, to design systems which permit agents to be stationed practically anywhere. However, all of the current systems use a type of network computer to transmit data relating to the incoming telephone calls to remote agent computer terminals. The network computer also provides third party call control. Typically, the network computer and ACD communicate through a proprietary interface. The ACD transmits data relating to an incoming telephone call over the proprietary interface to the network computer. The network computer formats the data for retransmission over a computer network to a selected agent computer terminal. Similarly, instructions from the agent computer terminal are transmitted over the computer network to the network computer which formats the instructions in accordance with the proprietary interface for transmission to the ACD.

Three significant disadvantages are noticeably present in these prior systems. First, the systems require relatively expensive network computers which add to the their cost. Second, if the system owner desires to separately purchase a network computer, the ACD manufacturer will need to disclose the proprietary interface between the network computer and the ACD. ACD manufacturers may be reluctant to disclose this information. Finally, prior systems which utilize remote agent computer terminals over a computer network provide only third party call control.

Accordingly, there is a need in the art for a telephone switching system employing an ACD to route incoming telephone calls and to transmit data relating to the telephone calls to remote agent computer terminals over a computer network, such as a local area network (LAN) or wide area network (WAN), which uses an open interface, which does not require a designated system computer and which provides first party call control.

SUMMARY OF THE INVENTION

This need is met by a telephone switching system and method of the present invention for establishing voice communications between a caller and one of a plurality of agents wherein the one agent receives data relating to the incoming telephone call from an automatic call distributor through a computer network, such as the Internet. An agent computer terminal associated with the one agent displays the data. The data is transmitted over the computer network directly from the automatic call distributor in an open interface format. The one agent is able to subsequently control the incoming telephone call through the agent computer terminal.

In accordance with one aspect of the present invention, a telephone switching system for establishing voice communications between a caller and one of a plurality of agents is provided. The telephone switching system comprises an automatic call distributor which receives an incoming telephone call from the caller and selectively transmits the incoming telephone call to one of the agents. An agent telephonic unit associated with the agent receives the call and establishes voice communications between the caller and the agent. The agent telephonic unit is connected to the automatic call distributor via a telephone network. The agent has an agent computer terminal for inputting instructions, for generating control signals representative of the instructions and for providing the control signals to the automatic call distributor to subsequently control the incoming telephone call. The control signals are transmitted from the agent computer terminal to the automatic call distributor over a computer network.

In accordance with another aspect of the present invention, an automatic call distributor for establishing voice communications between an incoming telephone call from a caller and one of a plurality of agents is provided. Each of the agents is associated with an agent computer terminal for generating control signals representative of desired subsequent control of the incoming telephone call. The control signals are transmitted over a computer network to the automatic call distributor. An agent telephonic unit provides voice communications between the caller and the agent. The automatic call distributor comprises a multiport switch for connecting the incoming telephone call to the agent telephonic unit associated with the agent. A central processing unit controls the multiport switch to connect the incoming telephone call to the agent telephonic unit associated with the agent. The central processing unit also receives the control signals from the agent computer terminal associated with the agent over the computer network and subsequently controls the incoming telephone call based on the control signals. Consequently, the agent has first party call control of the incoming telephone call.

In accordance with yet another aspect of the present invention, a method for controlling operation of an automatic call distributor is provided. The method comprising the steps of: receiving an incoming telephone call from a caller at the automatic call distributor; selectively routing the incoming telephone call to one of a plurality of agents; generating control signals by an agent computer terminal associated with the one of the agents, the control signals being representative of desired subsequent control of the incoming telephone call; transmitting the control signals over a computer network to the automatic call distributor; and subsequently controlling the incoming telephone call based on the control signals.

These and other features and advantages of the present invention will become apparent from the following detailed

DETAILED DESCRIPTION OF THE INVENTION

Figure 1:
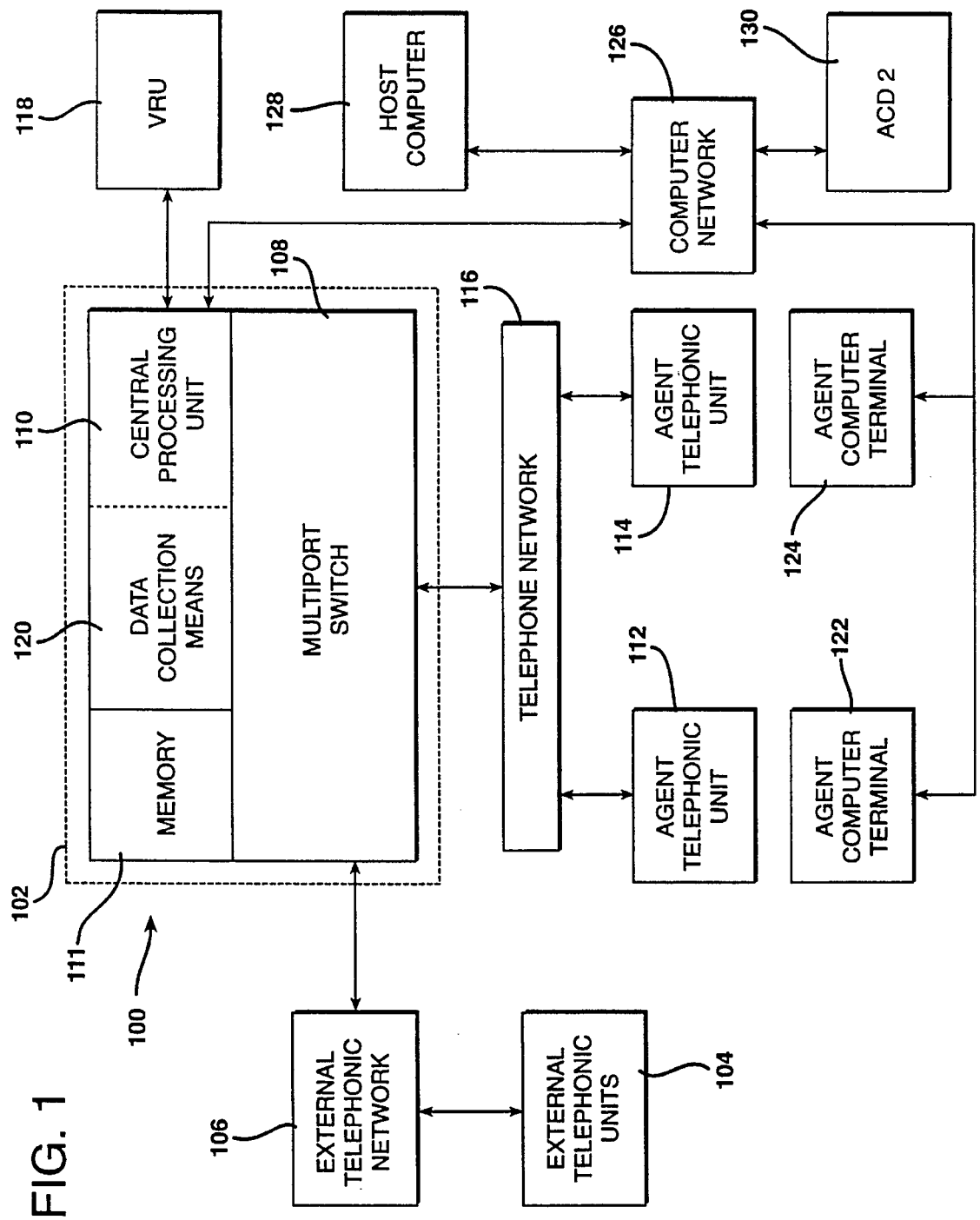
FIG. 1 is a block diagram of a telephone switching system in accordance with the present invention.

A telephone switching system 100 comprising an automatic call distributor (ACD) 102 for routing incoming telephone calls made by callers from external telephonic units 104 via an external telephonic network 106 in accordance with the present invention is shown in FIG. 1. The ACD 102 includes a multiport switch 108 controlled by a central processing unit 110, in conjunction with a memory 111, to interconnect callers at the external telephonic units 104 with agents positioned at agent telephonic units 112, 114 to establish voice communications through the telephone network 116. For example, the central processing unit 110 may dial a conventional telephone number to access one of the agent telephonic units 112 or 114. The telephone network 116 may be any of a number of systems for transmitting voice signals, such as dedicated T1 lines, an analog telephone system or an integrated services digital network. It should be understood that "incoming telephone calls" may denote telephone calls made by callers who are external to the ACD 102 or telephone calls made by agents of the ACD 102 to other agents of the ACD 102. For clarity and ease of description, the computing circuits of the ACD 102 have been designated as the central processing unit 110, however, the central processing unit 110 may be comprised of a multitude of electronic logic devices, such as one or more microprocessors.

A conventional voice response unit 118, or voice board, provides voice processing capabilities to the ACD 102. As is well known, the voice-response unit 118 generates audio prompts which request that a caller provide additional data. The caller typically responds to the audio prompts by selecting a particular key or keys, on the telephone. Since the structure and philosophy of voice response units are well known in the art and are not important to the present invention beyond obtaining additional data from a caller, details of such units will not be further disclosed herein.

The central processing unit 110 comprises a software-based data collection means 120 for collecting data relating to incoming telephone calls. The data collection means 120 obtains information in any of a number of well known manners. For example, automatic number identification (ANI) information and/or dialed number identification service (DNIS) information may be collected by the data collection means 120. In addition, or alternatively, the data collection means 120 may detect over which trunk, or trunk group, an incoming telephone call has been transmitted to the ACD 102. All of the above data provides information which may be advantageously used by the agents to service the callers.

The data collected by the data collection means 120 and the voice response unit 118 is made available to the agents through agent computer terminals 122, 124 substantially simultaneously with the corresponding incoming telephone calls on the agent telephonic units 112, 114. The central processing unit 110 transmits the collected data and/or the additional data over a computer network 126 to the agent computer terminals 122, 124. Preferably, the data is formatted in an open interface such as the well-known telephony server application interface (TSAPI). As should be readily apparent to those skilled in the art, the data would be sent over the computer network 126 with an address, or other code, for identifying which agent computer terminal 122 or 124 is to receive the data. The agent computer terminal 122, 124 which receives the data is associated with the agent telephonic unit 112, 114 receiving the incoming telephone call from which the data was collected by the central processing unit 110 in any of a number of well known manners.

Preferably, additional archive data may be received from a host computer 128. The archive data is stored in the host computer 128 and, upon the proper instructions, is downloaded to the appropriate agent computer terminal 122, 124. As will be readily comprehended by those skilled in the art, various methods may be employed to download the data from the host computer 128. For example, the host computer 128 may access the collected data sent by the central processing unit 110 to a selected agent computer terminal 122 or 124. Using the collected data, the host computer 128 may automatically access the appropriate archive data and download it to the selected agent computer terminal 122 or 124. Alternatively, one of the agent computer terminals 122, 124 may receive the collected data and/or the additional data and in response thereto, generate a signal requesting the appropriate archive data from the host computer 128. As should be apparent, any number of methods may be advantageously employed in the present invention to transmit the archive data from the host computer 128 to one of the agent computer terminals 122, 124 substantially simultaneously with the incoming telephone call related to the archive data.

When an incoming telephone call is connected to one of the agent telephonic units 112, 114, the collected data and, preferably, the additional data and the archive data are substantially simultaneously displayed on the respective agent computer terminal 122, 124. Various software programs contained in the agent computer terminals 122, 124 control how the data is displayed on the agent computer terminals 122, 124. Having been connected to the caller and viewing the data, the agent is now able to efficiently and ably handle the incoming telephone call.

Thereafter, the agent may however need to initiate further call processing of the incoming telephone call. Some examples of call processing functions which agents may perform from the agent computer terminals 122, 124 include transferring an incoming telephone call to another agent, or even another ACD2 130, setting up a conference call, requesting assistance from a supervisor, initiating an emergency and the like. Through the agent computer terminal 122, 124, an agent is capable, for example, of executing any or all host applications, console applications, supervisor applications, reports applications, network control and maintenance, voice response unit applications, voice mail and fax/modem functions. To perform each of these functions, the agent enters the proper keystrokes in the agent computer terminal 122, 124. The agent Computer terminal 122, 124 then transmits the proper instructions formatted in TSAPI over the computer network 126 to the central processing unit 110.

Since the central processing unit 110 is programmed to read and understand instructions received directly from the agent computer terminals 122, 124 over the computer network 126, a network computer, as in previous systems, is not required. Consequently, an agent through one of the agent computer terminals 122, 124 has partial or total first party control over the ACD's call processing functionality. As long as they are connected to the computer network 126, the agent computer terminals 122, 124 may be remotely located.

Having thus described the invention in detail by way of reference to preferred embodiments thereof, it will be apparent that other modifications and variations are possible without departing from the scope of the invention defined in the appended claims. For example, numerous addressing methods may be used to identify and monitor devices connected to the computer network 126.

What is claimed is:

1. A telephone switching system for controlling communications between a caller and one of a plurality of agents, the telephone witching system comprising:

an automatic call distributor for receiving an incoming telephone call from the caller and for selectively dialing a telephone number of the one of the agents;

an agent telephonic unit associated with the one of the agents for answering the incoming telephone call;

a telephone network connecting the agent telephonic unit to the automatic call distributor;

an agent computer terminal for receiving instructions from the one of the agents, for generating control signals representative of the instructions and for providing the control signals directly to a central processing unit within the automatic call distributor to subsequently control the incoming telephone call; and a computer network for transmitting the control signals from the agent computer terminal to the automatic call distributor.

2. The telephone switching system as recited in claim 1 wherein the automatic call distributor comprises:

data collection means for collecting data relating to the incoming telephone call, and wherein the central processing unit transmits the collected data to the agent computer terminal associated with the one of the agents over the computer network.

3. The telephone switching system as recited in claim 2 further comprising:

a voice response unit connected to the central processing unit for audibly prompting the caller for additional data when the automatic call distributor receives the incoming telephone call, and wherein the central processing unit transmits the additional data to the agent computer terminal associated with the one of the agents over the computer network.

4. The telephone switching system as recited in claim 2 wherein the incoming telephone call includes automatic number identification information, and wherein the data collection means collects the automatic number identification information and the central processing unit transmits the automatic number identification information to the agent computer terminal.

5. The telephone switching system as recited in claim 2 wherein the incoming telephone call includes dialed number identification service information, and wherein the data collection means collects the dialed number service identification information and the central processing unit transmits the dialed number service identification information to the agent computer terminal.

6. The telephone switching system as recited in claim 1 wherein the computer network comprises a local area network.

7. The telephone switching system as recited in claim 1 wherein the computer network comprises a wide area network.

8. The telephone switching system as recited in claim 1 wherein the control signals are formatted in telephony server application programming interface format.

9. The telephone switching system as recited in claim 1 wherein the telephone network comprises an integrated services digital network.

10. The telephone switching system as recited in claim 1 comprising a host computer for storing archived data regarding the caller and for transmitting the archived data to the agent computer terminal over the computer network.

11. A method for controlling operation of an automatic call distributor comprising the steps of:

receiving an incoming telephone call from a caller at the automatic call distributor;

selectively dialing a telephone number of one of a plurality of agents;

answering the incoming telephone call at an agent telephonic unit associated with the one of the agents;

generating control signals by an agent computer terminal associated with the one of the agents, the control signals being representative of desired subsequent control of the incoming telephone call;

transmitting the control signals over a computer network directly to a central processing unit within the automatic call distributor; and subsequently controlling the incoming telephone call based on the control signals.

12. The method as recited in claim 11 further comprising the steps of:

collecting data regarding the incoming telephone call; and transmitting at least a first portion of the collected data to the agent computer terminal associated with the one of the agents.

13. The method as recited in claim 12 further comprising the steps of:

transmitting at least a second portion of the collected data from the agent computer terminal over the computer network to a host computer;

searching memory in the host computer for archived data based on the at least a second portion of the collected data; and transmitting the archived data to the agent computer terminal over the computer network.

14. The method as recited in claim 12 further comprising the step of formatting the collected data into telephony server application programming interface format prior to transmitting the collected data over the computer network.

15. The method as recited in claim 11 further comprising the steps of:

audibly prompting the caller for additional data by means of a voice response unit connected to the automatic call distributor; and transmitting the additional data to the agent computer terminal over the computer network.

16. The method as recited in claim 11 further comprising the step of formatting the control signals in telephony server application programming interface format prior to transmitting the control signals over the computer network.

* * * * *